(12) United States Patent  (10) Patent No.: US 7,834,973 B2
Klein et al.  (45) Date of Patent: Nov. 16, 2010

(54) LIQUID CRYSTAL DISPLAY DEVICE

(75) Inventors: Susanne Klein, Stroud (GB); Adrian Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 575 days.

(21) Appl. No.: 11/629,692

(22) PCT Filed: Jun. 30, 2005

(86) PCT No.: PCT/EP2005/053092

§ 371 (c)(1),
(2), (4) Date: Dec. 12, 2007

(87) PCT Pub. No.: WO2006/003171

PCT Pub. Date: Jan. 12, 2006

(65) Prior Publication Data

US 2008/0198281 A1  Aug. 21, 2008

(30) Foreign Application Priority Data

Jul. 2, 2004  (GB)  ................................. 0414873.0

(51) Int. Cl.
*C09K 19/60* (2006.01)
*G02F 1/1333* (2006.01)
(52) U.S. Cl. ........................................ 349/165; 349/88
(58) Field of Classification Search .................. 349/165
See application file for complete search history.

(56) References Cited

U.S. PATENT DOCUMENTS 6,016,178 A * 1/2000 Kataoka et al. ............. 349/117
2002/0005930 A1 * 1/2002 Sonehara ...................... 349/165

2007/0141275 A1  6/2007  Hikmet

FOREIGN PATENT DOCUMENTS

| EP | 02219680 | 9/1990 |
|----|----------|--------|
| EP | 04039630 | 2/1992 |
| FR | 2666342 A | 3/1992 |
| FR | 2 827 052 | 1/2003 |
| GB | 2 021 411 | 12/1979 |
| JP | 50-8462 | 4/1975 |
| JP | 2003-315539 | 11/2003 |

OTHER PUBLICATIONS

Bahadur, B. , 1991, "Display Parameters and Requirements," Liquid Cystals, Applications and Uses.
Bahadur, B., 1992, "Dichroic LCDs" Liquid Crystals, Applications and Uses.
Brauner, K., et al., 1956, Tschermarks Miner. Petrog. Mitt., 6, pp. 120-140.

(Continued)

*Primary Examiner*—W. Patty Chen

(57)  ABSTRACT

A liquid crystal display device comprises a layer of liquid crystal material (3) between spaced-apart cell walls (1,2), and electrodes (5) provided on at least one cell wall for applying an electric field across at least a part of said liquid crystal material. The liquid crystal material has anisotropic light-absorbing particles dispersed therein and substantially aligned therewith. The invention also provides a composition for use in the display.

12 Claims, 15 Drawing Sheets

OTHER PUBLICATIONS

Wang, W., et al., "Synthesis of CuO and Cu2O Crystaline nanowires using Cu(OH)2 Nanowire templates," J. Mater. Res., vol. 18, No. 12, (Dec. 2003).

Jordan, J.W., 1949, Journal of Physical & Colloid.

Pizzey, C, et al., "Suspensions of Colloidal plates in a nematic liquid crystal: a small angle x-ray scattering study," Journal of Physics: Condensed Matter 16 pp. 2479-2495 (2004).

Hatalis, M.K., et al., "Flat Panel Display Materials II," Symposium held Apr. 8-12, 1996 San Francisco, Ca.

Takeuchi, H., et al., 1997, Mat. Res. Soc. Symph. Proc. 424, pp. 317-322.

van Duijnevelt, J.S., "Large scale structures in liquid crystal/clay colloids" Journal of Physics: Condensed Matter 17, pp. 2255-2267 (2005).

* cited by examiner

LIQUID CRYSTAL DISPLAY DEVICE

FIELD OF THE INVENTION

This invention relates to liquid crystal display devices.

BACKGROUND TO THE INVENTION

Liquid crystal display devices have been well known for many years. Display modes such as twisted nematic, supertwist, and hybrid aligned nematic require polarizers to generate two or more optically different states.

Guest-host liquid crystal devices operate by reorienting an anisotropic dye (the guest) which is dissolved in a liquid crystal ("LC") host. The orientation of anisotropy of the guest is aligned with and follows the orientation of the director of the host. Guest-host LC systems are potentially attractive, especially for reflective displays, because they offer the prospect of eliminating the expensive and optically wasteful polarizers and, in the case of plastic displays, the requirement for birefringence-free substrates. Guest-host liquid crystal devices to date have had limited commercial success, mainly because suitable material properties have not been attainable.

The key parameters of a guest host display are

Physical and chemical stability, especially photostability

Concentration of the guest—to get a sufficiently high absorption in a thin layer Dichroic ratio—to get a good contrast, the guest must be well ordered in the host, and must have a high ratio of absorption between orthogonal directions.

Viscosity of the mixture—if this is too high, the system may switch too slowly to be of use.

SUMMARY OF THE INVENTION

According to an aspect of the present invention there is provided a liquid crystal display device comprising a layer of liquid crystal material between spaced-apart cell walls, and electrodes provided on at least one cell wall for applying an electric field across at least a part of said liquid crystal material; wherein the liquid crystal material has anisotropic light-absorbing particles dispersed therein and substantially aligned therewith.

We have found that by using anisotropically absorbing colloidal particles or pigments dispersed in and aligned with the liquid crystal, benefits of greater photostability and chemical stability may be achieved, together with an improved tradeoff between dichroic ratio, optical density and viscosity.

The orientation of the particles is controlled in the present invention by the orientation of the liquid crystal host. The particles therefore do not need to have either positive or negative dielectric anisotropy.

The present invention may be used with bistable LC modes for improved multiplexing and power consumption. The invention therefore works differently from and offers benefits over prior art technologies using dispersed particles. Such technologies include Suspended Particle Displays (FR 2827052), in which anisotropic pigment particles dispersed in an isotropic medium are oriented by an electric or magnetic field, or Polymer Dispersed LCDs (JP 08194211), in which the refractive index of the LC is matched to the refractive index of a polymer film which contains droplets of the LC doped with a dichroic dye. The display appears to switch between a scattering coloured state and a clear, less coloured state.

The term "anisotropic light-absorbing particles" is used herein to refer to anisotropic pigment particles and dichroic colloidal particles which absorb light more when oriented in one direction than when oriented in another direction. The dichroic colloidal particles may be pigment particles or they may be particles of one or more materials which are naturally colourless but which have been modified to absorb light by incorporation of a chromophore, for example a dye which is chemically bonded to, absorbed in or adsorbed on said material.

Because the anisotropic light-absorbing particles adopt the alignment of the liquid crystal (ie, anisotropic rod-like or lath-like particles tend to align parallel with the local liquid crystal director) benefits of conventional LC displays are retained, such as relatively low operating voltages and relatively sharp threshold voltage, which facilitates matrix-addressing (multiplexing).

In a preferred embodiment the liquid crystal material is a nematic or chiral nematic (cholesteric) material, although it could optionally comprise a smectic material. As is well known for conventional guest-host LCDs, a higher contrast ratio may be achieved without the use of a polarizer if the LC is a chiral nematic because of the helical alignment resulting from the chirality. For a nematic host, use of a polarizer is desirable to improve the contrast ratio.

A single colloidal particle or pigment species may be used, or a mixture of colloidal particles or pigments to achieve a desired dark-state colour.

There are a number of ways to make and stabilise anisotropically absorbing colloidal particles or pigments. The anisotropy in absorption could derive from shape anisotropy, where more absorbing material is presented to the light in some orientations than in others; from absorption anisotropy, where the fundamental absorption mechanism is anistotropic (as in the case of dichroic dyes); or some combination of both. The absorption anisotropy should be as high as possible. Considerations of optical scattering and colloidal stability suggest that particles should be less than about 500 nm in their maximum dimension, although first results have been achieved with particles where one dimension was in the micron range.

Sources of suitable materials include:

Purification and modification of naturally occurring materials such as clays. Normally white or transparent in solution, dyes may be attached to form so-called substrate pigments.

Anisotropic crystal growth, e.g., it has been demonstrated that selenium and tellurium have helical crystal structures that lead to 1-dimensional nanocrystals[1].

[1] B. Gates, B. Mayers, B. Cattle and Y. N. Xia, *Synthesis and characterization of uniform nanowires of trigonal selenium*, Adv. Funct. Mater. 12 (2002) 219.

Nanocrystal engineering, e.g., it has been shown that the addition of a capping agent that binds strongly to a specific crystal face diminishes growth at that face and may yield nanorods[2].

[2] X. G. Peng et al., *Shape control of CdSe nanocrystals*, Nature 404 (2000) 59.

"Soft" template techniques, e.g., the precipitation of materials in suitably shaped micelles[3].

[3] M. Li, H. Schnablegger and S. Mann, *Coupled synthesis and self-assembly of nanoparticles to give structures with controlled organization*, Nature 402 (1999) 393.

Particle growth in "hard" templates, e.g., the electrodeposition of metals in porous alumina[4].

[4] S. R. Nicewarner-Pena et al., *Submicrometer metallic barcodes*, Science 294 (2001) 137.

Vapour phase methodologies, e.g., the laser ablation of Si/SiO$_2$ targets to form Si nanowires[5].

[5]W. S. Shi et al., *Synthesis of large areas of highly oriented, very long silicon nanowires*, Adv. Mater. 12 (2000) 1343.

The following criteria are important:
a high yield of anisotropic particles,
a high degree of particle monodispersivity, either due to preparation of particles of a single size or facile post-preparation size and shape selective separation routes,
production of pigments that are dispersible in organic media or posses surfaces that can be easily chemically modified to render the particles dispersible,
stability at high volume fraction,
particles that possess suitable absorption spectra,
particles that are stable in manufacturing processes and display environments.

It is preferred that the liquid crystal material is uniformly orientated in the absence of an electric field to ensure well-defined on and off states.

Accordingly, a further aspect of the invention provides a liquid crystal display device comprising:
a layer of liquid crystal material between spaced-apart cell walls;
electrodes provided on at least one cell wall for applying an electric field across at least a part of said liquid crystal material;
a surface alignment on an inner surface of at least one of said cell walls which induces a desired local alignment of adjacent molecules of said liquid crystal material; and
anisotropic light-absorbing particles dispersed in and substantially aligned with said liquid crystal material;
the liquid crystal material being switchable from a first orientation to a second orientation by an applied electric field;
wherein reorientation of the liquid crystal material from said first orientation to said second orientation will cause reorientation of said particles from said first orientation to said second orientation; and
wherein said particles are capable of absorbing substantially more incident light in one of said orientations than in the other of said orientations.

Any desired orientation may be used: for example planar, tilted, or twisted. The orientation may be homeotropic where the LC has negative dielectric anisotropy. Other aspects and benefits of the invention will appear in the following specification, drawings and claims.

BRIEF DESCRIPTION OF THE DRAWINGS

The invention will now be further described, by way of example, with reference to the following drawings in which.

DETAILED DESCRIPTION

Liquid Crystal

In the following experimental work a single liquid crystal host, 4-pentyl-4'-cyanobiphenyl (K15, Merck), was used. K15 exhibits the nematic phase at room temperature and has a nematic-isotropic transition temperature of 35° C., allowing handling at moderate temperature throughout the suspension process.

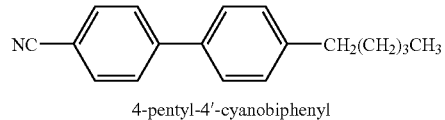

4-pentyl-4'-cyanobiphenyl

Clays

Figure 1:
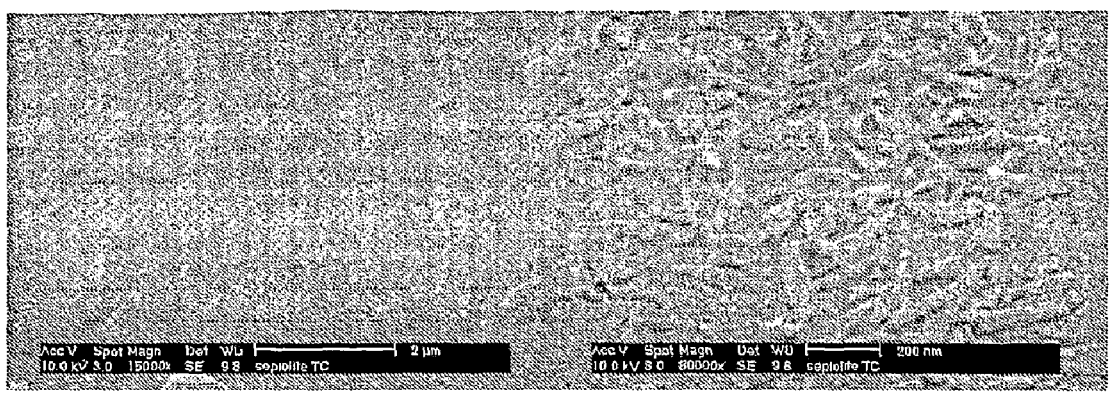
FIG. 1 shows micrographs of sepiolite rods after cleaning and filtering, at 15,000 and 80,000 magnification.

Montmorillonite and Sepiolite are naturally occurring clays. The montmorillonite used in this study was GWB Wyoming Bentonite (industrial grade), a light grey coloured sodium bentonite from Colony in the state of Wyoming, USA. As sepiolite we used Sepiolite 60/120 (an industrial grade) which consists of 80% sepiolite and 20% associated minerals. Both clays were supplied by Steetley Bentonite and Absorbants Limited. Organic contamination was removed by washing the clays in 30% hydrogen peroxide solution. 100 ml of hydrogen peroxide solution was added to 10 g of clay and stirred overnight. The mixture was then gently heated to remove all remaining hydrogen peroxide. The mixture was then wet sieved through a sieve tower with decreasing retention from 500 µm down to 38 µm. 1000 ml of de-ionized water was added and the clay-water solution was filtered through a Whatman 5 paper filter with 2.5 µm retention. The clay was left to settle out, the supernatant was siphoned off and the remaining particles were dried under atmospheric conditions. The yield is 25% for both clays. The cleaning procedure leads to relatively mono-dispersed Sepiolite rods with an average length of 200 nm, as shown in FIG. 1. The quartz particles visible in FIG. 1 can be separated chemically from the sepiolite particles.

Figure 2:
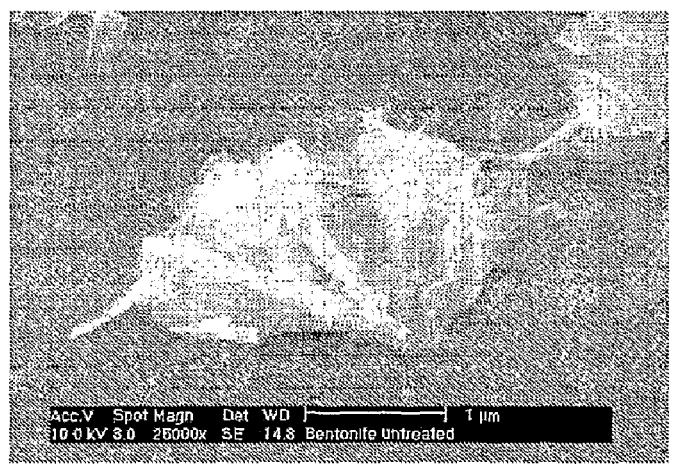
FIG. 2 is a micrograph of untreated GWB Wyoming Bentonite plates.

Montmorillonite is a very soft particle (FIG. 2) whose poly-dispersity was not very much reduced by filtering. Filtering removes mainly contaminants and non-delaminated particles.

Sepiolite 60/120 and GWB Wyoming Bentonite have negatively charged surfaces, i.e. positively charged molecules can be adsorbed. From preliminary studies [Pizzey et al. 2004] we knew that montmorillonite needed a so-called stabilizer to stay suspended in a liquid crystal. Therefore it was treated with a combination of dimethyldioctadecylammonium bromide (DODAB) and cationic dyes. GWB Wyoming Bentonite was totally dispersed in water (1 g, 1% w/w) by stirring for 24 hours prior to treatment.

The surfactant DODAB (Acros Chemicals, used as received) was added in dilute solution in an 80:20 water: propanol mix to give 50% coverage using the Cation Exchange Capacity (CEC) given in reference [Van Olphen and Fripiat 1979]. Dye dissolved in water was added next. The treated clay was cleaned by repeated washing and was subsequently dried under vacuum to remove all traces of water [Jordan 1949]. The particles were finely ground with a glass pestle and mortar. Sepiolite does not require any stabilizer when suspended in K15. The dye coverage was therefore 100% and no DODAB was added.

We chose four different dyes, as detailed in Table 1:

TABLE 2

Reference Ingredients and ingredients used for production of copper (II) oxide nanowires.

| Ingredients given in [Wang 2003] | Ingredients used. |
| --- | --- |
| Anhydrous copper (II) sulphate | Copper (II) sulphate pentahydrate |
| 0.15 M Ammonium hydroxide | Megaposit MF-26A from Shipley Europe Ltd. Coventry, UK. |
| 1.2 M NaOH | 1.2 M KOH |

TABLE 1

Cationic dyes for the treatment of negatively charged clays.

| Neutral Red | (structure shown) | $M_r = 288.8$ g |
| Methyl Green | (structure shown) | $M_r = 608.8$ g |
| Bismarck Brown | (structure shown) | $M_r = 461.4$ g |

The dyes were supplied by Sigma-Aldrich and used as received.

Synthesised Particles

Copper Oxide

The procedure to make copper oxide nanowires involved making a blue precipitate of copper (II) hydroxide and warming it in pure water for 3 hours at 60° C. A brown/grey solid of copper (II) oxide resulted [Wang 2003]. The particles were wires with the shape coming from the orthorhombic copper (II) hydroxide particles acting as a template.

The ingredients given in reference [Wang 2003] were not immediately available. Substitutes described in Table 2 were used.

The biggest difference in the ingredients was the use of Megaposit MF-26A (containing tetramethyl ammonium hydroxide) rather than ammonium hydroxide. Megaposit and MF are trade marks of Shipley Company, L.L.C., Marlborough, Mass. The word Megaposit will be used herein to denote this product. The concentration of the tetramethyl ammonium hydroxide in the Megaposit was unknown and the amount added was based on an educated guess.

The procedure to make the nanowires was taken from [Wang 2003]. A clear blue solution of copper (II) sulphate was prepared by dissolving 1.5 g of copper (II) sulphate pentahydrate in 100 ml of water. To the solution was added Megaposit. Initially 30 ml of Megaposit was used but variations were undertaken to optimise the reaction. After addition the solution became turbid and green-blue in colour and was rapidly stirred for 30 minutes before the addition of 6 ml of 1.2 M potassium hydroxide added drop wise over 15 minutes. The resulting copper (II) hydroxide was sky blue and phase separated within a couple of minutes. The precipitate was slightly gel-like and was filtered and washed 3 times to remove excess of reactants.

In addition to this sample using 30 ml Megaposit other samples were made with 20 ml and 50 ml of Megaposit added. The colour of the resulting solutions was highly dependent on the concentration of Megaposit added.

Figure 3:
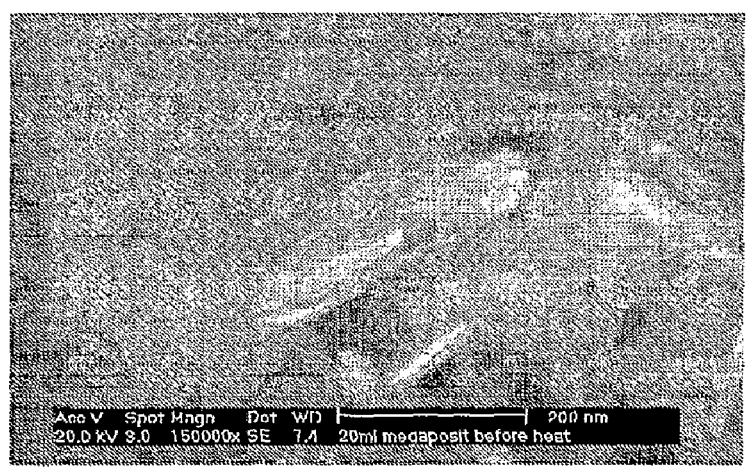
FIG. 3 is a micrograph of particles produced by addition of 20 ml of Megaposit to copper (II) sulphate solution.

Small samples of the clean dispersions were dried at room temperature overnight to glass slides and submitted for examination under the electron microscope. The shape of the copper (II) hydroxide particles in the precipitate acted as the template for the production of the copper oxide nanowires [Wang 2003]. For the dispersion made with the lowest concentration of Megaposit (20 ml) no wires were found, only small flat rectangular shapes (FIG. 3). It was known that if too little tetramethyl ammonium hydroxide was used the reaction would not proceed to make the copper (II) hydroxide but the concentration of the tetramethylammonium hydroxide in the Megaposit was unknown.

Figure 4:
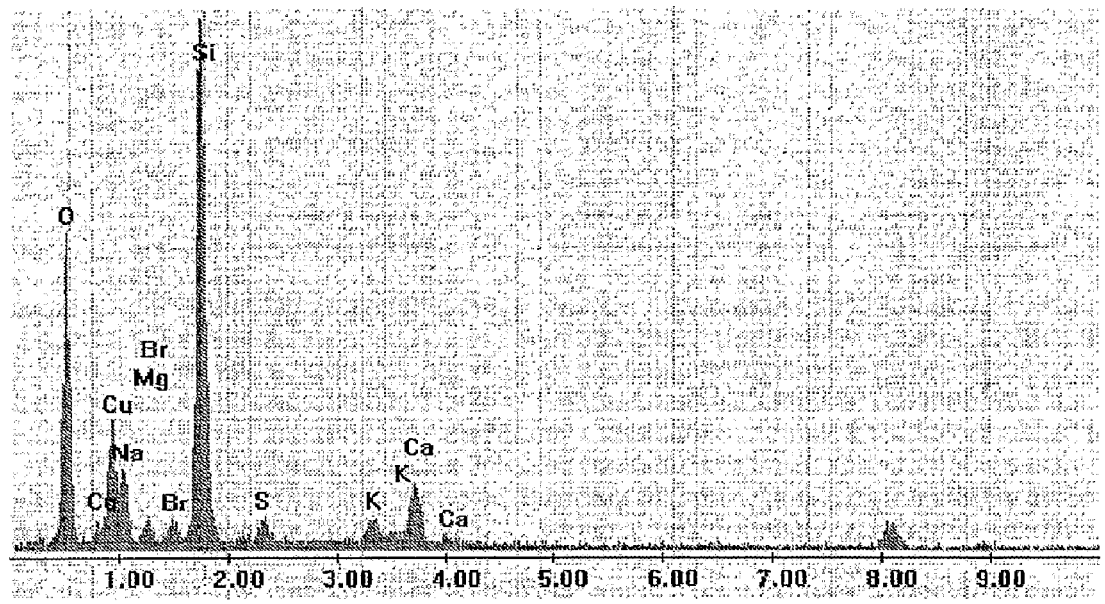
FIG. 4 is an EDAX spectrum of the particles of FIG. 3.

The exact nature of the particles shown in FIG. 3 was not known but an idea of their elemental composition was given by EDAX (FIG. 4). The EDAX spectrum shows a peak due to sulphur indicating the presence of unreacted copper (II) sulphate.

Figure 5:
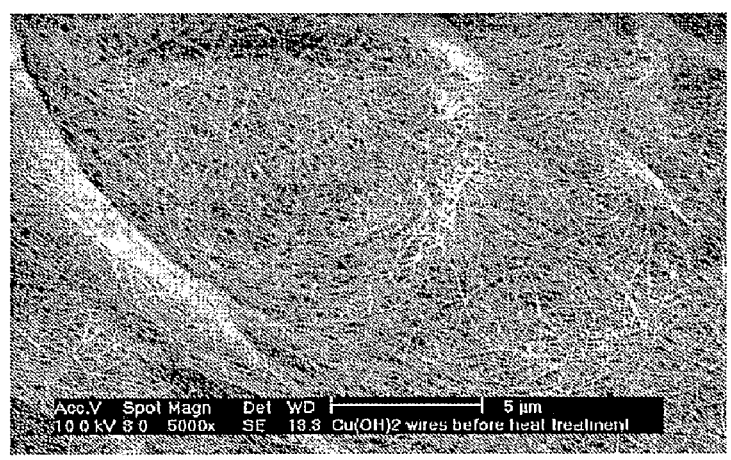
FIG. 5 is an electron micrograph of copper (II) hydroxide particles produced by the addition of 30 ml of Megaposit to copper (II) sulphate solution.

With the addition of 30 ml of Megaposit the blue colour of the precipitate was a very good sign that copper (II) hydroxide was present and this was supported by the electron micrograph (FIG. 5). A tangled mass of long copper (II) hydroxide wires can be seen. These are the templates for the copper (II) oxide particles. The length of some of the strands exceeded 10 μm but all of the wires were very thin.

At higher concentration of Megaposit wires were also found but irregular shapes and plate-shaped particle started appearing. In addition many of the wires appeared to be well attached to neighbours, a feature not seen for the particles in FIG. 5. Nevertheless the highest concentration (50 ml of Megaposit) gave the highest yield of copper oxide wires. The sample dispersed in water was heated in an oven for 3 hours at 60° C. to change the copper (II) hydroxide to copper (II) oxide. When left to stand it phase separated after a few minutes showing the particles produced were bigger or more mutually attractive. The resulting black-brown copper oxide wires were washed several times with de-ionised water and dried in an oven at 60° C. for 15 hours.

Figure 6:
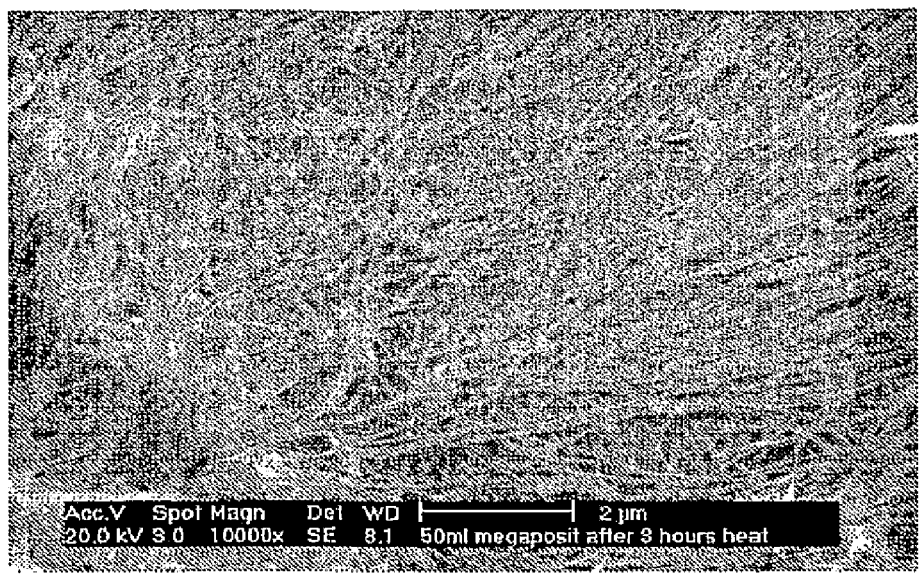
FIG. 6 is a micrograph of particles produced by the addition of 50 ml of Megaposit to copper (II) sulphate solution and heated at 60° C. for 3 hours only.
Figure 7:
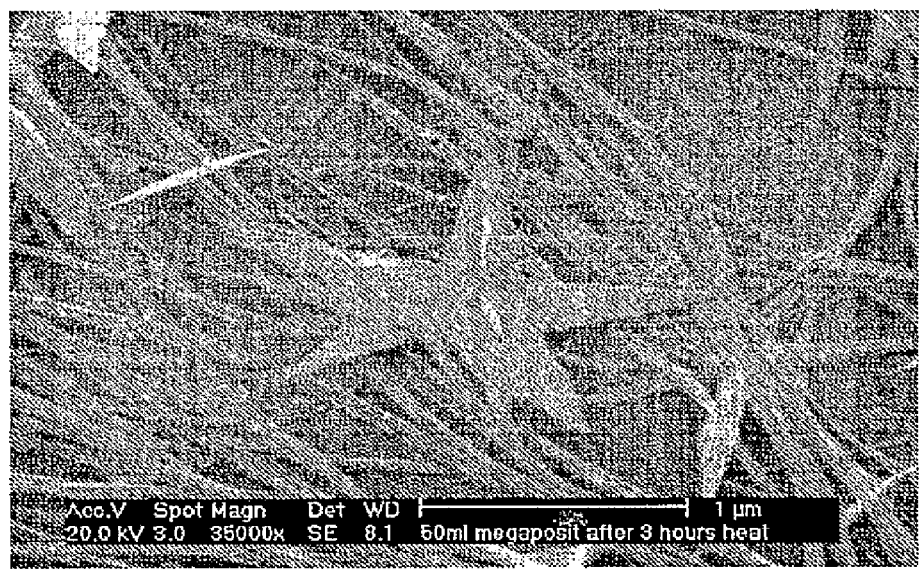
FIG. 7 is a micrograph showing copper (II) oxide wires.

The wires produced appear to be quite thick (FIG. 6) but they were made up of a number of strands lying side-by-side (FIG. 7). The copper oxide wires in FIG. 7 can be seen individually and show a low polydispersity in diameter. The close-up of the wires gives an idea they are flexible as they are bent with items lying on top and underneath them and they are clearly very fine strands.

Herapathite

Figure 8:
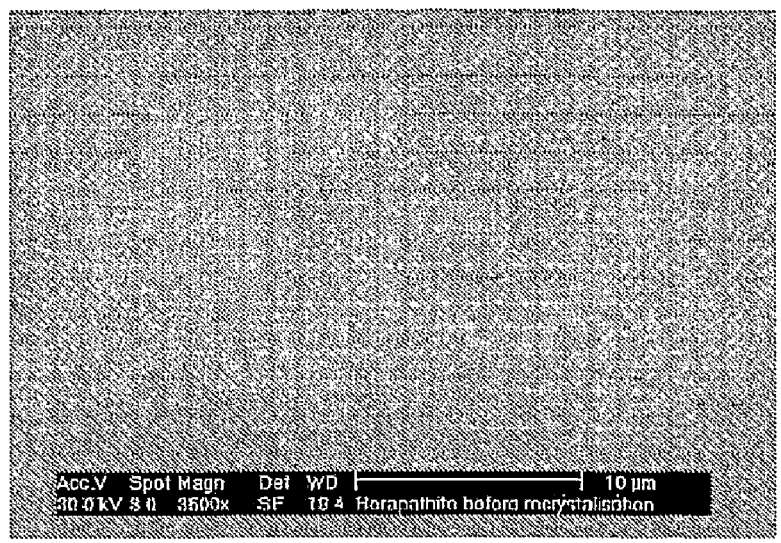
FIG. 8 is a micrograph of herapathite plates from a comparative experiment.

A detailed description how to make Herapathite rods of submicron length can be found in [Marks 1975]. We preferred to follow the much simpler procedure described in [Takeuchi 2003]: To a mixture of ethanol, water, acetic acid and sulphuric acid quinine was added and dissolved. This solution was poured into a solution of iodine and potassium iodide in ethanol and water. It was stirred for an hour and then Herapathite plates (see FIG. 8) could be filtered out. According to [Takeuchi 2003] recrystallization from ethanol/water or sonication should lead to rods, but we were not successful with these methods. The herapathite stayed in the form of α-herapathite, i.e. plates.

Suspensions

Montmorillonite and Sepiolite are very resistant to stress and shear forces. Therefore we can suspend the dry powder directly into the liquid crystal. K15 is heated above the clearing point of 35° C. and the clay powder is added. For samples smaller than 1 ml the samples are thoroughly mixed in a hand-homogenizer. For samples bigger than 3 ml we use a high shear mixer (IKA: Ultra Turax T25) and drive it at 24000 rpm for 3 min. The mixture is then transferred into an ultrasonic bath, a 0.8 litre Fisherbrand FB11020 with an operating power of 100 watts emitted through two transducers located in the base. The frequency of the sonic wave was not known but 40 KHz is considered typical giving a wavelength of 3.75 cm. The samples are sonicated for 15 min, stirred for 10 min and sonicated for another 15 min.

The copper oxide and the herapathite particles are destroyed by ultra-sound. Herapathite was first dispersed in ethanol and then mixed in equal amounts with K15. The mixture is then transferred into a vacuum oven at 60° C., 200 mbar (20 kPa) and left there until all the ethanol is evaporated. Copper oxide powder was added to K15 and dispersed by hand-homogenizer only.

Stability of Suspensions

Figure 9:
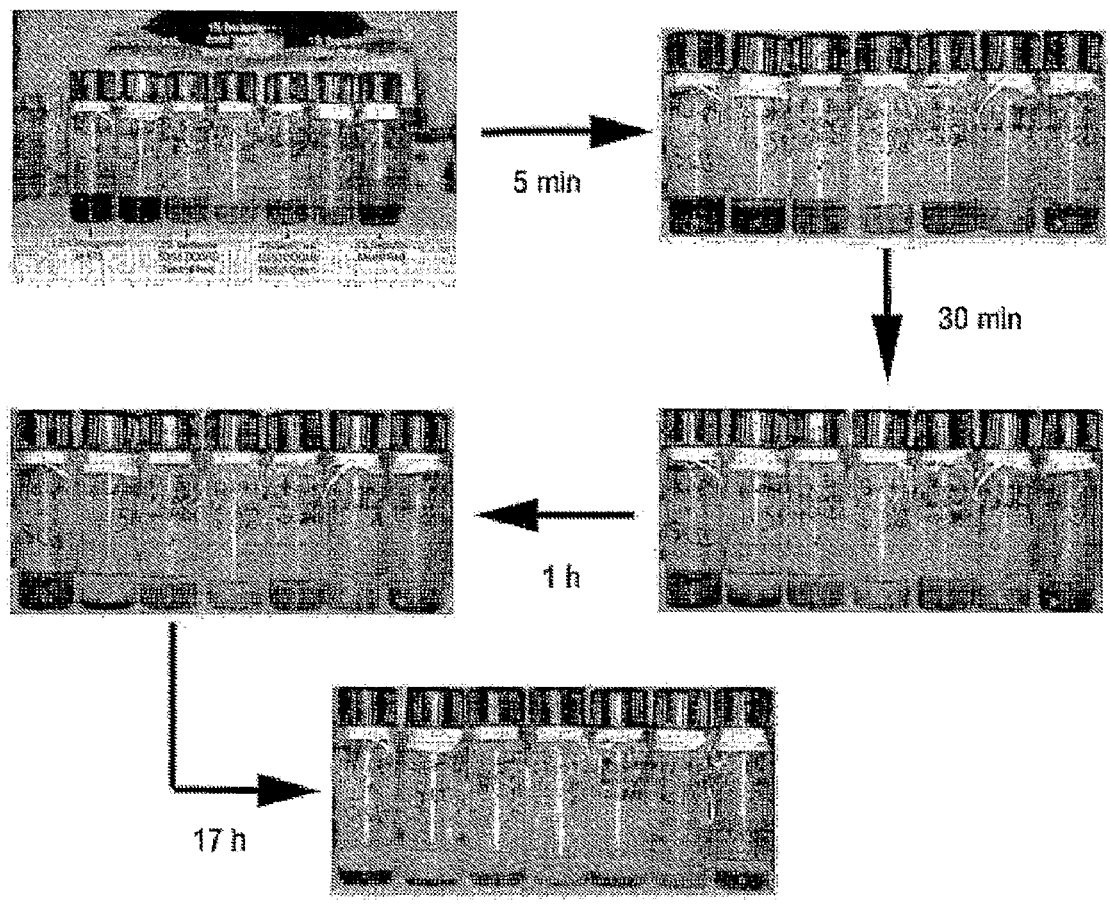
FIG. 9 shows phase separation of experimental particle suspensions in a K15 host.

The most stable suspension is formed by dyed Sepiolite in K15. Above the nematic-isotropic transition temperature the suspension does not phase separate for weeks. Cooling the suspension into the nematic phase results in phase separation within minutes. A thin layer of particle poor liquid crystal forms on top of a particle rich layer. This indicates that the particles are expelled from the nematic phase and form open flocks. All suspensions prepared separate into a particle rich and a particle poor phase. The copper oxide rods crash out fastest and the dyed Sepiolite slowest. FIG. 9 shows different stages of this process. The suspensions shown in FIG. 9 are (from left to right): 1.6 w.w. % Herapathite, 1.7 w.w. % CuO, 1 w.w. % GWB Wyoming Bentonite 50/50 DODAB/Neutral Red (i.e. DODAB adsorbed to 50% if the negative surface charges and 50% are covered by Neutral Red), 1 w.w. % GWB Wyoming Bentonite 50/50 DODAB/Bismarck Brown, 1 w.w. % GWB Wyoming Bentonite 50/50 DODAB/Methyl Green, 1 w.w. % Sepiolite Methyl Green (i.e. Methyl Green is adsorbed to all the negative surface charges), 1 w.w. % Sepiolite Neutral Red.

Nevertheless the suspensions are stable enough to be characterized by Small Angle X-ray Scattering [Pizzey 2004], Nuclear Magnetic Resonance [Klein 2004] or optically, i.e. measuring the dichroic ratio.

Dichroic Ratio

Definition of dichroic ratio: $DR=D_{parallel}/D_{perpendicular}$, where $D_{parallel}$ and $D_{perpendicular}$ are optical densities of the aligned dye doped LC measured for light polarizations parallel and perpendicular to the rubbing direction defining the molecule orientation. Conventionally $D_{parallel}$ and $D_{perpendicular}$ are measured at the maximum absorption band. However for a dye with a wide absorption spectrum or a black dye, the dichroic ratio is evaluated over the whole visible spectrum [Bahadur 1992]:

$$DR_{vs} = \frac{\int A_{par}(\lambda)d\lambda}{\int A_{per}(\lambda)d\lambda} \quad [1]$$

where $A_{par}(\lambda)$ and $A_{per}(\lambda)$ are the parallel and perpendicular absorbance of the dye at wavelength $\lambda$. To account for the photopic response of the human eye for colour, the photopic dichroic ratio can be defined as $$DR_{ph} = \frac{\int A_{par}(\lambda)V(\lambda)d\lambda}{\int A_{per}(\lambda)V(\lambda)d\lambda} \quad [2]$$

where $V(\lambda)$ is the value of photopic luminosity efficiency function at wavelength $\lambda$ [Bahadur 1991].

When dye is attached to a particle the orientation of the transition moment (colour generation dipole) of the dye molecule is not necessarily coupled directly to the orientation of the liquid crystal molecules. It is mediated by the orientation of the particle in the nematic matrix. Formulas [1] and [2] are based on the assumption that the dye molecules align parallel to the liquid crystal molecules. The values calculated by these formulas are not always meaningful in the case of dyed particles. We define therefore a dichroic ratio for coloured particles:

$$DR_{particle} = \frac{\int A_{strong}(\lambda)d\lambda}{\int A_{weak}(\lambda)d\lambda} \quad [3]$$

where $A_{strong}(\lambda)$ and $A_{weak}(\lambda)$ are the strong and weak absorbance of the coloured particle in oriented suspension at wavelength $\lambda$.

Ideally a display filled with a colloidal suspension of coloured particles would work without polarizers. The 'contrast ratio CR' is defined here in a similar way as $DR_{particle}$, but without any polarizer provides some information about the feasibility of the suspension as display material.

Sample Preparation

Figure 10:
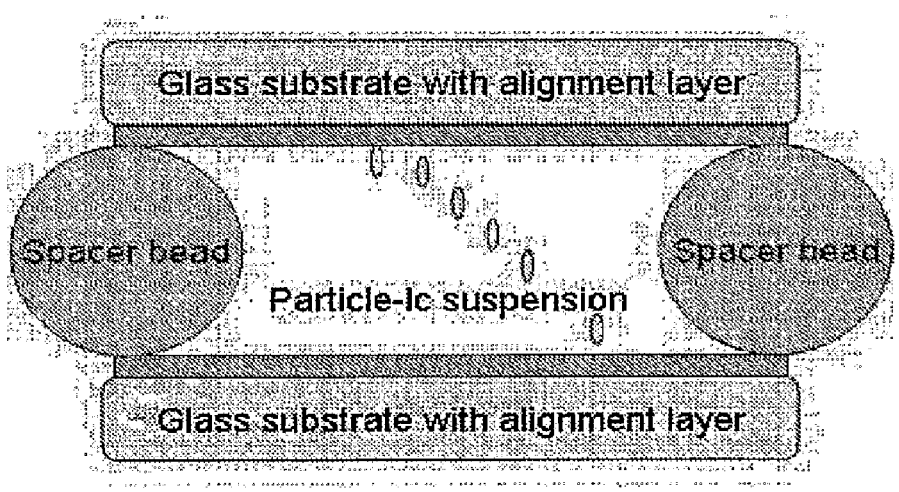
FIG. 10 is a schematic sectional view through a liquid crystal device for determination of dichroic ratios.

For the determination of the dichroic ratio the suspensions were contained in between two glass substrates (FIG. 10). These substrates were treated with alignment layers. Nissan 1211 (Brewer Science, used as received) was used as a homeotropic alignment layer and Al 1254 (JSR Microelectronics, used as received) for planar alignment. Both aligning agents are polyimides, and both were applied by spin-coating at 4000 rpm for 30 seconds, followed by heating on a hotplate at 95° C. for 1 minute, then baking for 1 hour in an oven at 180° C. The AL 1254 was then rubbed to induce uniform planar alignment. The treated substrates were put on a hotplate and heated above the transition temperature of the liquid crystal. 10 μm spacer beads in UV-curable glue (Norland Optical Adhesive 73) were applied to two opposite edges of the substrate. The isotropic suspension was then pipetted onto the hot substrate and covered with the second substrate. The assembled cell was cured under a UV-lamp (UV-A) for 3 min. We are aware that the suspensions could be damaged by exposure to UV, but glass substrates do not allow assembling by laminating and capillary filling filters the particles from the suspension.

Figure 11:
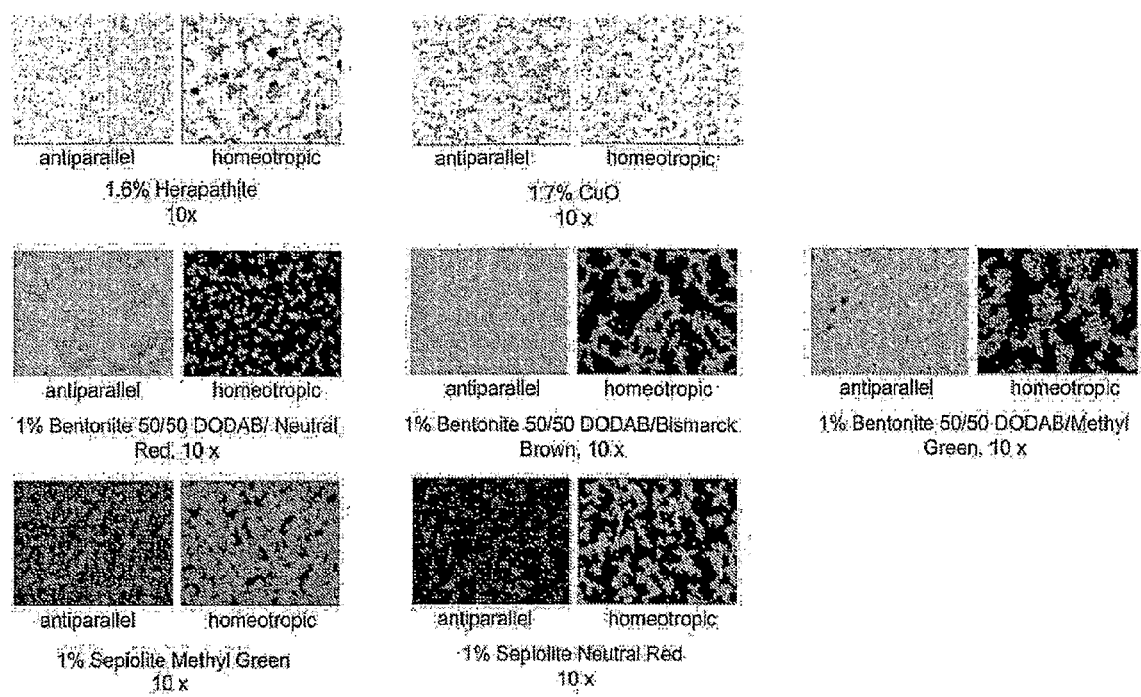
FIG. 11 shows photomicrographs of various experimental suspensions of anisotropic pigments in a K15 host.
Figure 12A:
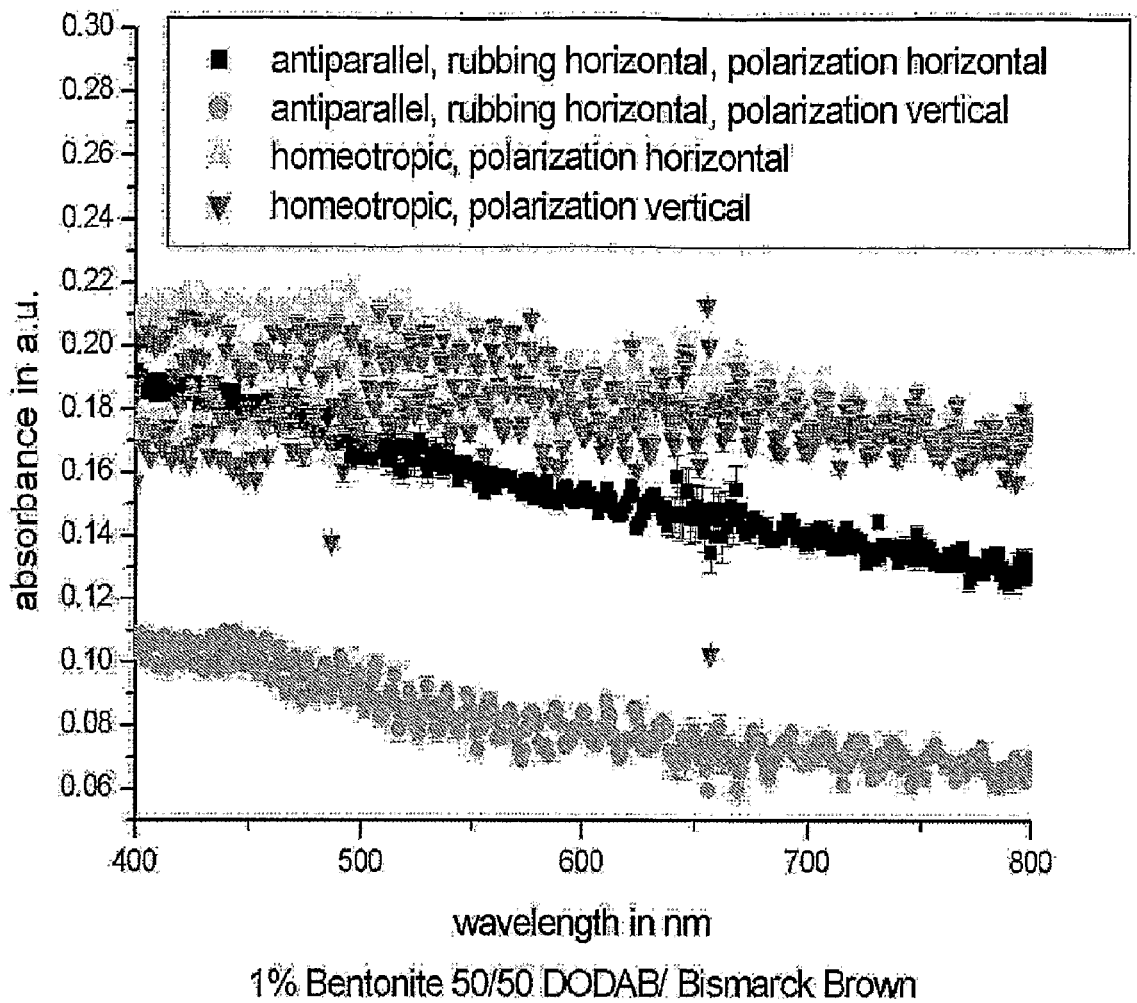
FIG. 12 shows spectra recorded for seven different suspensions and two different cell alignments.
Figure 12B:
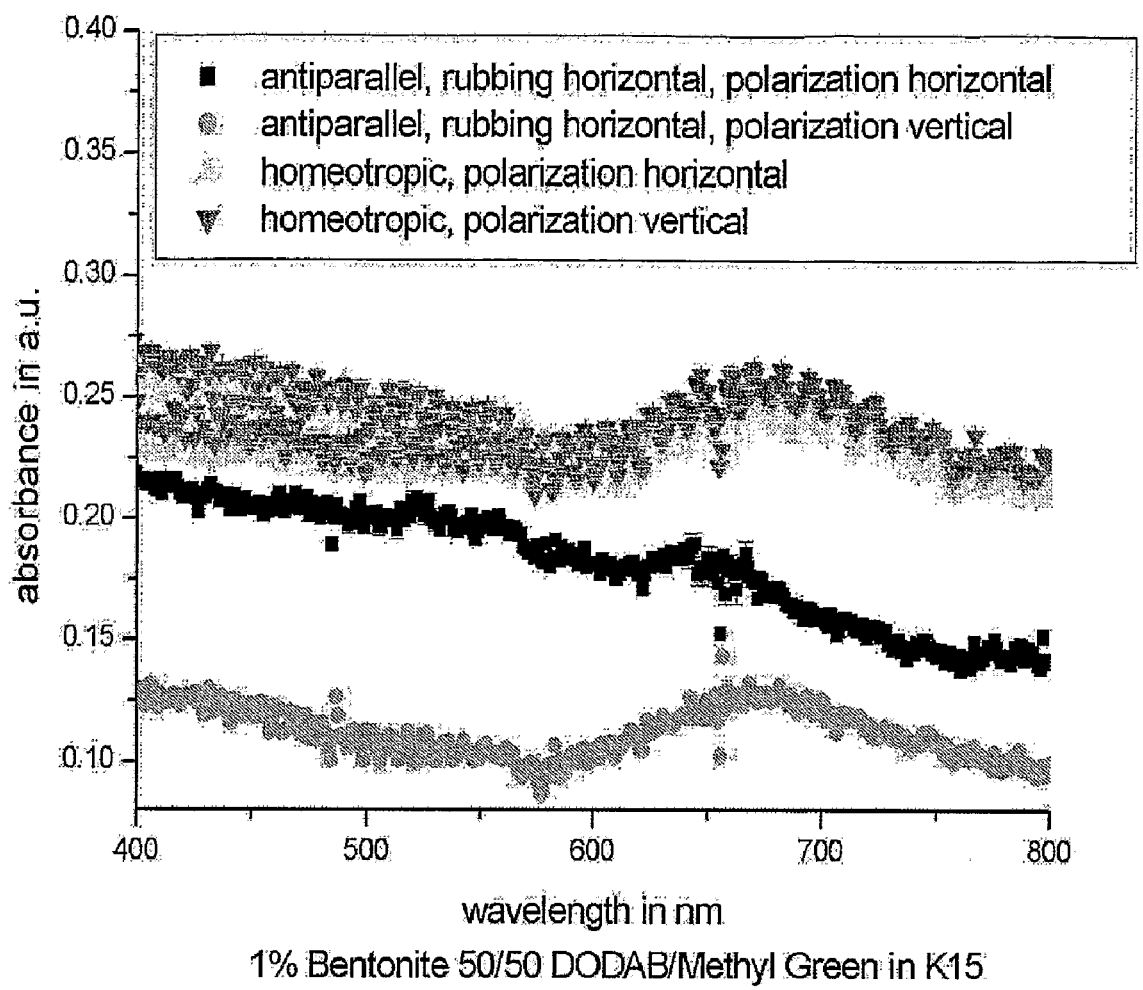
Figure 12C:
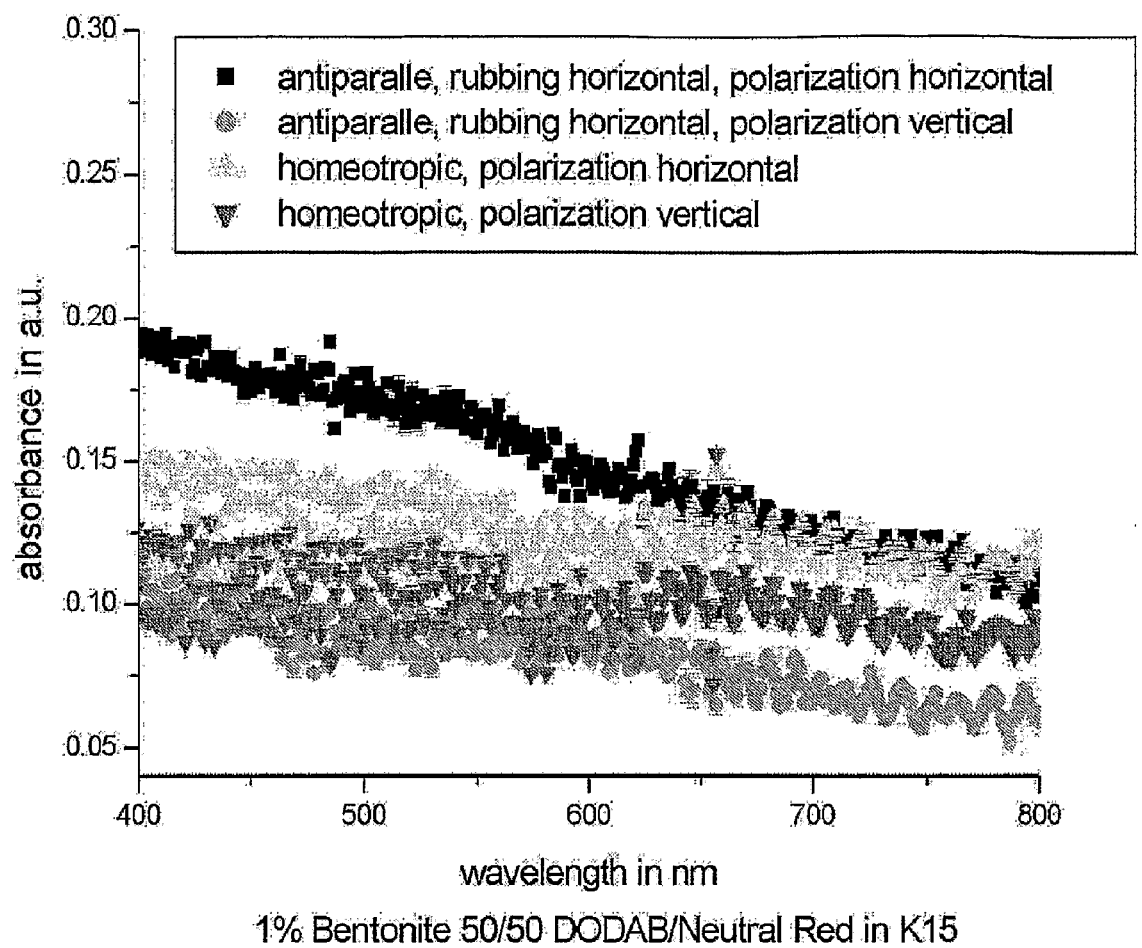
Figure 12D:
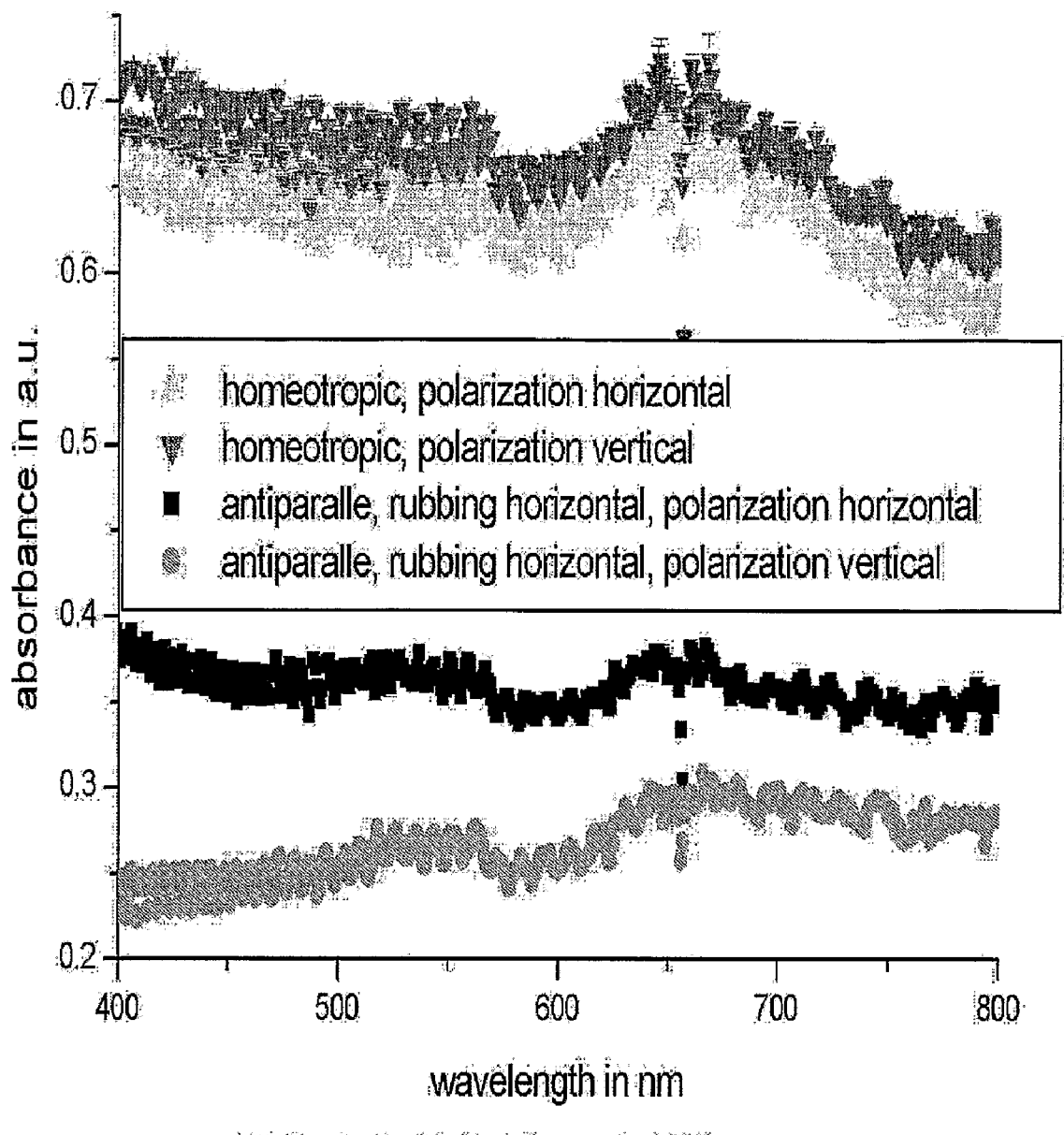
Figure 12E:
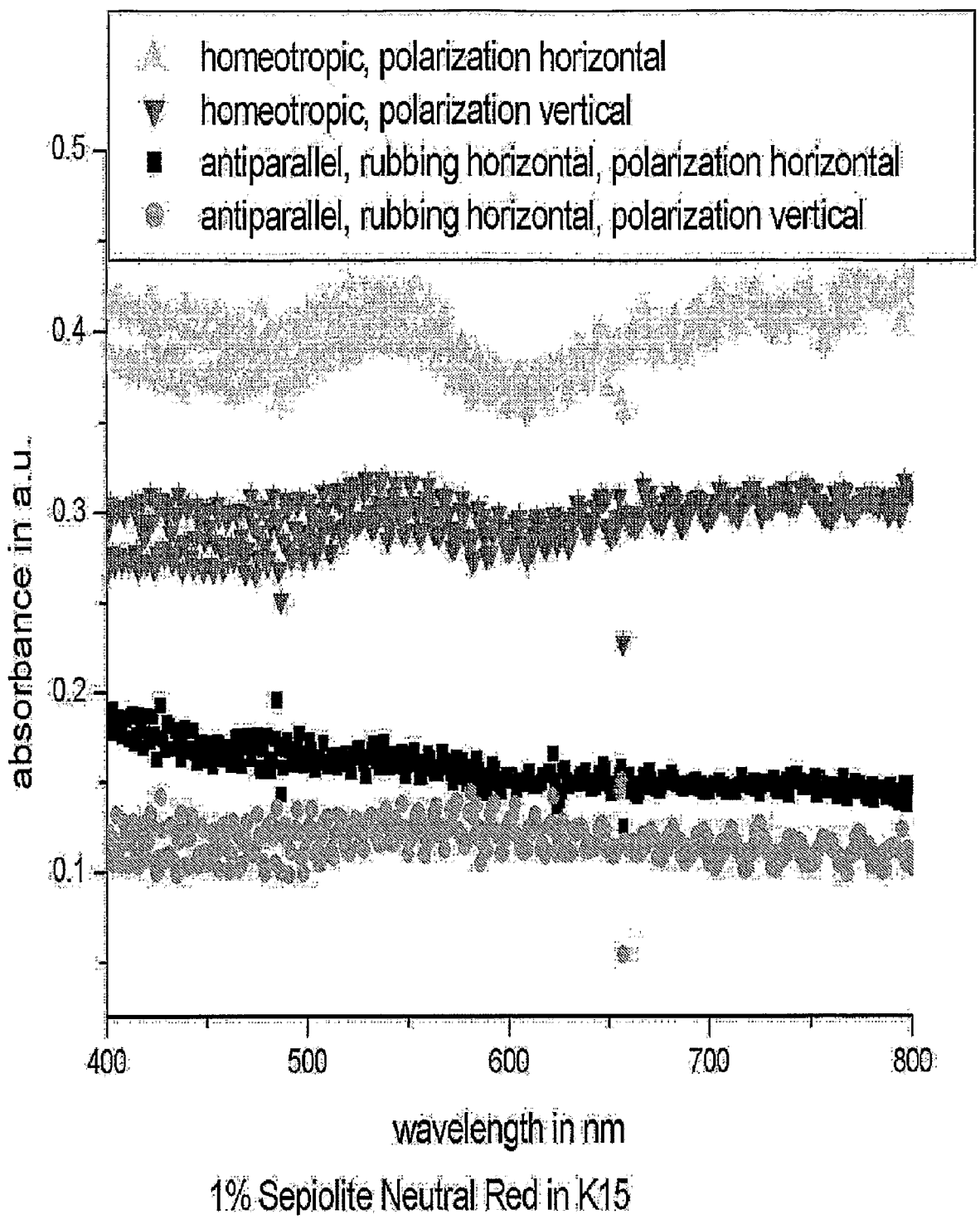
Figure 12F:
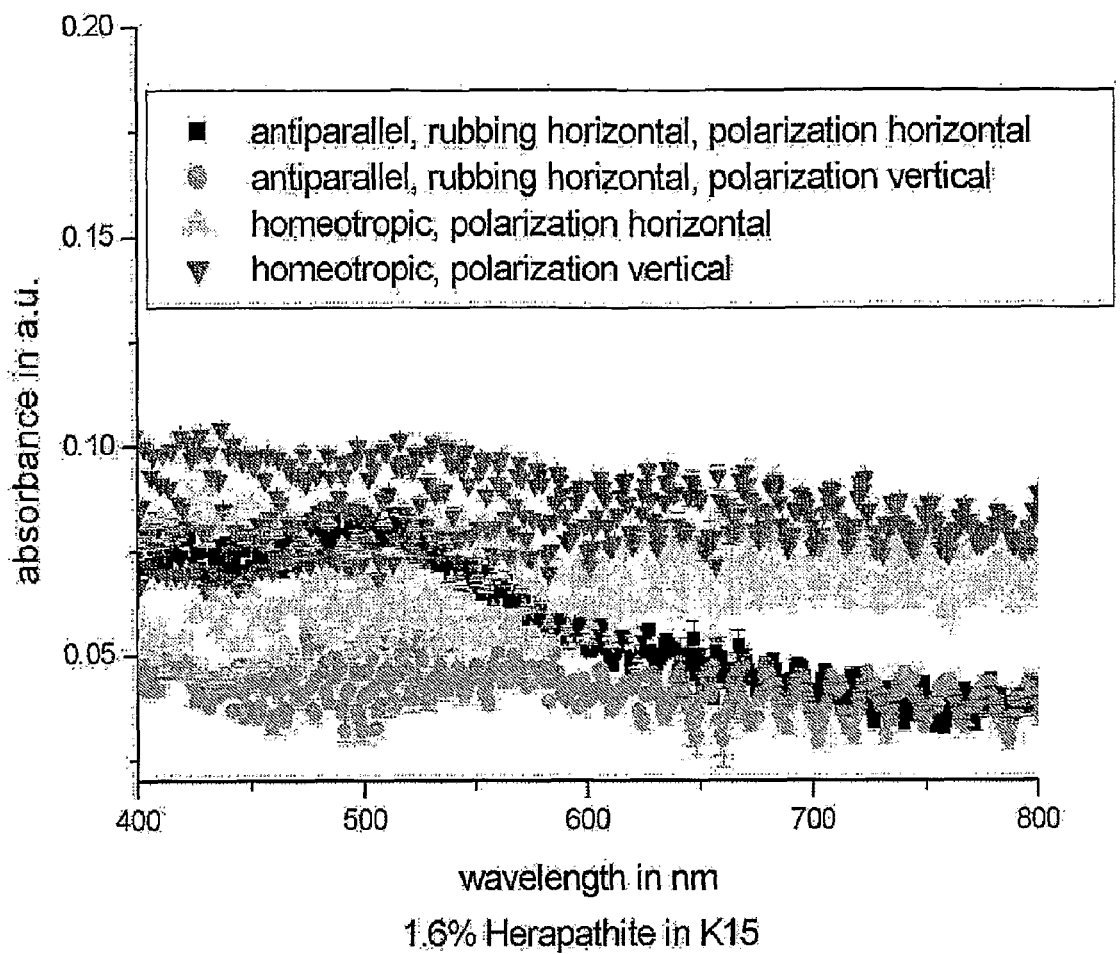
Figure 12G:
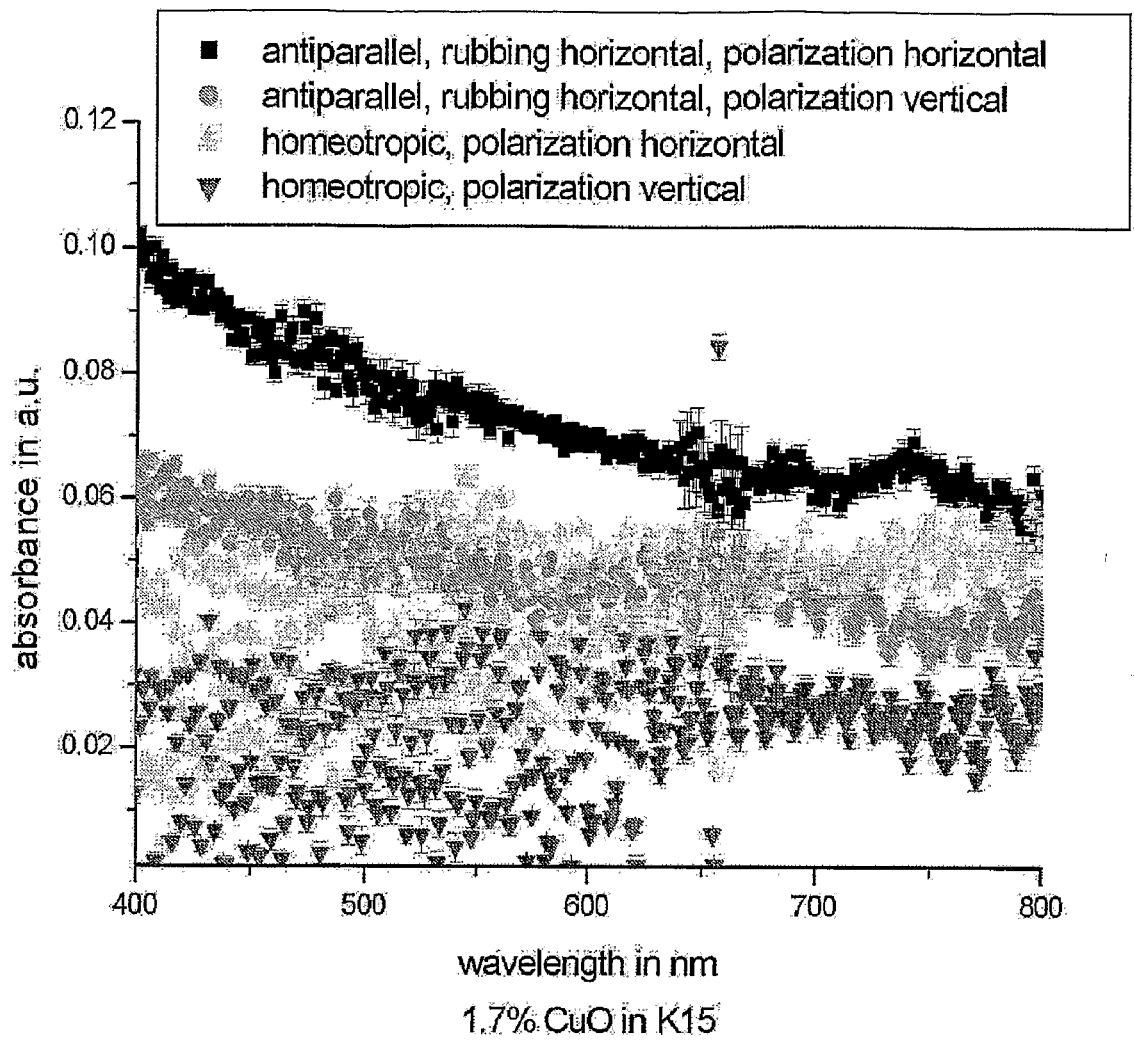

Inspection under the polarization microscope shows that all suspensions flocculate when cooled into the nematic phase (FIG. 11). The flock structure differs between homeotropically aligned cells and planar aligned cells. This indicates that the particles interact with the nematic matrix, i.e. a preferred orientation of the particle axes within the nematic order exists. Small Angle X-ray experiments have confirmed that Bentonite plates align perpendicular to the liquid crystal molecules [Richardson 2004]. Rods are suspected to align parallel to the LC molecules. Depending on the dye the orientation of the particles within the nematic phase should influence the dichroic ratio measure for the whole system.

Measured Dichroic Ratios

The Spectroscopy system used was a HP 8453 UV-visible spectrometer. The standard sample stage was replaced by a stage comprising a crystal polarizer in front of the light source and a sample holder, both on a rotation stage to allow the alignment of the polarizer and the direction of the liquid crystal molecules. Reference spectra (blanks) were taken with cells having the same alignment as the samples cells but no particles suspended in the liquid crystal. The results are summarized in table 3.

TABLE 3

Dichroic Ratios and Contrast Ratios for Coloured Particles in K15

| Suspension | $DR_{vs}$ | $DR_{particle}$ | CR |
| --- | --- | --- | --- |
| 1.6 w.w % Herapathite in K15 | 1.4 | 2 | 1.2 |
| 1.7 w.w. % CuO in K15 | 1.5 | 1.7 | 1.1 |
| 1 w.w. % Bentonite 50/50 DODAB/Neutral Red | 1.8 | 1.8 | 1.4 |
| 1 w.w. % Bentonite 50/50 DODAB/Bismarck Brown | 1.9 | 2.2 | 1.4 |
| 1 w.w. % Bentonite 50/50 DODAB/Methyl Green | 1.6 | 2.1 | 1.2 |
| 1 w.w. % Sepiolite Methyl Green | 1.4 | 2.5 | 2.1 |
| 1 w.w. % Sepiolite Neutral Red | 1.3 | 2.5 | 2.0 |

All the spectra are relatively flat, an indication that light is scattered from liquid crystal domains around the suspended particles. For Methyl Green on Sepiolite and Bentonite the absorbance peak is still visible, but shifted-from 629 nm (Methyl Green in water) to 660 nm on particles in K15 (FIG. 12).

Figure 13:
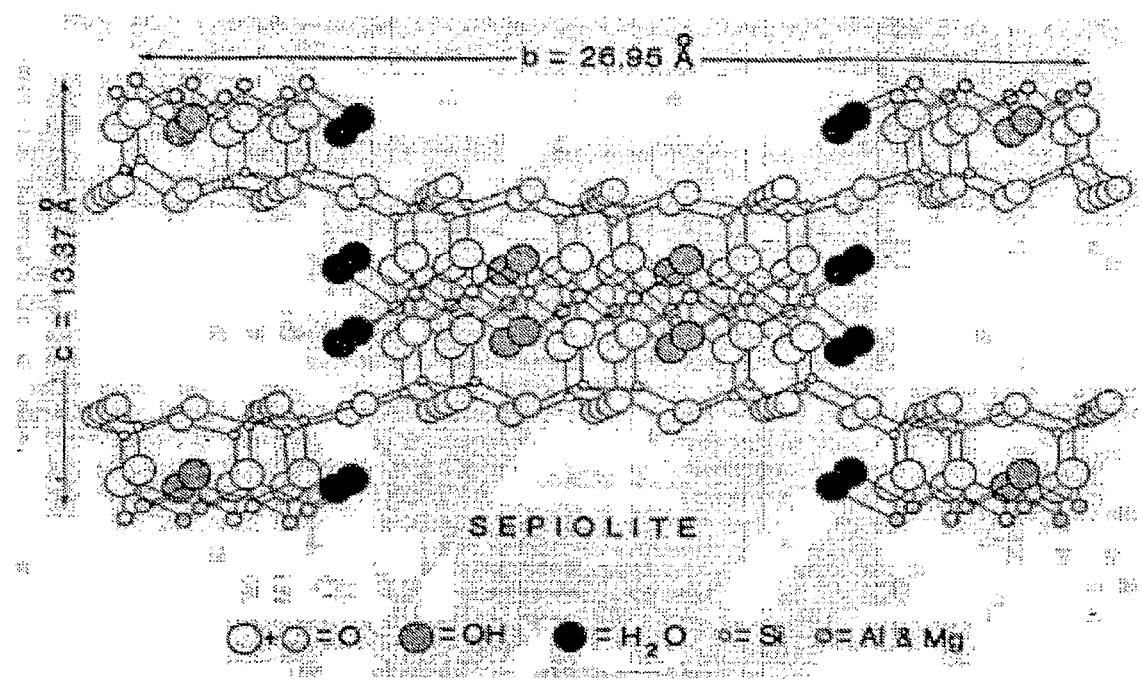
FIG. 13 illustrates a structure of sepiolite rods (Brauner & Preisinger 1956)

The best performance is achieved by dyed Sepiolite. From the clear difference in absorbance (FIG. 12) between the homeotropic and the antiparallel cell configurations we can deduce that Methyl Green and Neutral Red penetrate the pores (FIG. 13) along the long axis of the Sepiolite rods. The pore width is about 0.7 nm and its height about 0.3 nm. That restricts how the dye molecules can align within the tunnels. The alignment of the molecules in the channels at the sepiolite surface is governed by the position of the charged sites on the dye molecule. According to our estimates Neutral Red has a length of about 1.2 nm. The charged sites are at the two opposite ends of the molecule. We assume therefore that the molecule attaches flat to the outside surface channels and flat along the sides of the tunnels as well. The molecule is too long, by a factor 2, to span a tunnel, unless it attaches skewed. The absorbance in the antiparallel configuration is less than the one in the homeotropic configuration which suggests that the transition moment of Neutral Red is perpendicular to the liquid crystal molecules. Assuming a transition moment along the long axis of the molecule would lead to the conclusion that the Sepiolite rods had aligned perpendicular to the liquid crystal molecules.

We estimated the radius of the Methyl Green molecule to be 0.5 nm. The only way that this molecule can be disposed in the tunnels is by stacking up in a possibly slightly skewed way. From the absorbance data (FIG. 12) we can see again that the transition moment is perpendicular to the liquid crystal molecules. Stacked dye molecules in the Sepiolite channels and tunnels lead to the conclusion that the Sepiolite rods are now parallel to the liquid crystal molecules.

The CuO particles performed worst. The lifetime of the suspension was short and therefore the interaction with the nematic matrix was governed by the agglomeration process which leads to an unordered arrangement of the particles within the liquid crystal.

Middle ground was covered by the plates, Herapathite and dyed Bentonite. The absorbance data are not really conclusive. The absorbance of the dark state is equal to or smaller than the absorbance of the light state in the case of dyed Sepiolite and the difference between light and dark is very small.

CONCLUSIONS

All the suspensions prepared show some degree of dichroism indicating that the particles align in the nematic matrix. Results in Table 3 and the plots in FIG. 12 demonstrate that the optical performance is governed by the quality of the suspension. None of the suspensions is truly stable, but the best results are achieved by the Sepiolite suspensions where the particles agglomerate most slowly. There the absorbance is highest and bright and dark states are clearly separated. With careful tuning of the dye molecule size it should be possible to increase the absorbance in one rod orientation and decrease it in the other. CuO in suspension, the dispersion which phase separates first, performs worst when it comes to dichroic ratio and contrast, even though the particle itself is black and has a high aspect ratio. It is therefore paramount to stabilize the particles properly, i.e. the lifetime of the suspensions should exceed at least 14 days, before conclusions about the optical feasibility of the dispersions can be drawn.

Device

Figure 14:
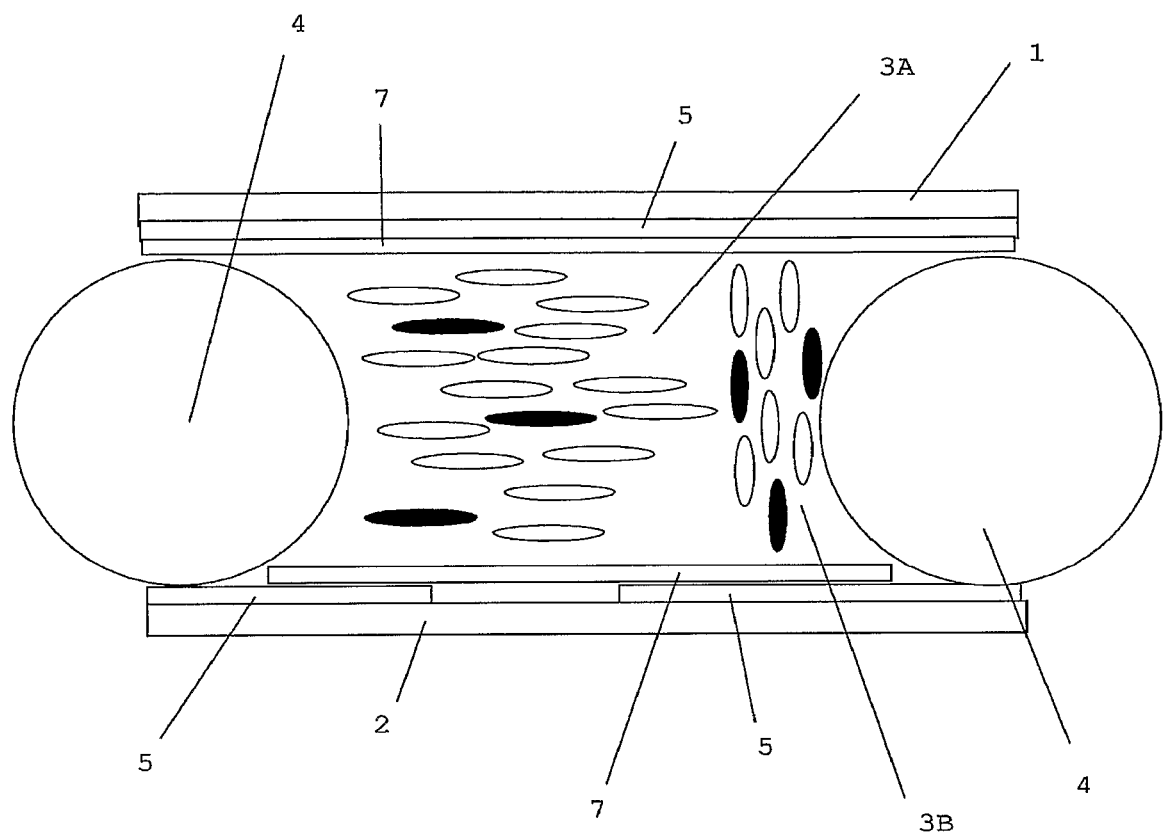
FIG. 14 is a schematic sectional view through a liquid crystal display device in accordance with one aspect of the present invention.

Referring now to FIG. 14, a possible implementation in accordance with an aspect of the invention is shown. The device comprises a first cell wall 1 and an opposed second cell wall 2, typically formed from glass or a translucent plastics material, spaced apart by means of spacer beads 4. Each cell wall 1, 2 is provided on an inner surface with at least one electrode 5. A planar alignment layer 7 is formed on each inner surface, over the electrodes 5, to induce adjacent liquid crystal molecules 3A to lie with their long axes substantially parallel with the plane of the cell wall surfaces in the absence of an applied field. Dispersed anisotropic pigments (shown schematically as dark-filled ellipses) are aligned with the LC molecules. In the planar alignment shown in region 3A the pigment absorbs light, particularly light of a specified polarization. The optional use of an external polarizer (not shown) to absorb light of different polarization will increase the contrast ratio of the display.

If a suitable electric field is applied via the electrodes 5, the LC molecules are switched to a vertically-aligned (homeotropic) state as illustrated in region 3B. The anisotropic pigment also adopts this alignment and absorbs light less strongly. When the electric field is removed, planar-aligned LC molecules at the alignment surfaces 7 rapidly induce a bulk reorientation of the LC layer to the planar alignment 3A.

REFERENCES

Bahadur, B., 1991, "Display Parameters and Requirements" in *Liquid Crystals, Applications and uses*, Ed. B. Bahadur (World Scientific)

Bahadur, B., 1992, "Dichroic LCDs" in *Liquid Crystals, Applications and uses*, Ed. B. Bahadur (World Scientific)

Brauner, K. and Preisinger, A., 1956, *Tschermaks Miner. Petrog. Mitt.*, 6, 120-140

Jordan, J. W., 1949, *Journal of Physical & Colloid Chemistry*, 53, 294-306

Klein., S et al., paper to be presented at the International Liquid Crystal Conference 2004

Richardson, R. M. et al, 2004, private communication

Marks, A. M., 1975, U.S. Pat. No. 3,900,417

Pizzey, C. et al, 2004, *Journal of Physics: Condensed Matter* (to be published)

Takeuchi, H. et al, 1997, *Mat. Res. Soc. Symp. Proc.* 424, 317-322

Van Olphen, H. and Fripiat, J. J. (Eds), 1979, Data Handbook for Clay Materials and Other Non-Metallic Minerals (Pergamon Press)

Wang, W. et all, 2003, *J. Mater. Res.*, 18, 2756-2759

What is claimed is:

1. A liquid crystal display device comprising:
   a layer of liquid crystal material between spaced apart cell walls;
   electrodes provided on at least one cell wall for applying an electric field across at least a part of said liquid crystal material;
   a surface alignment on an inner surface of at least one of said cell walls which induces a desired local alignment of adjacent molecules of said liquid crystal material; and
   anisotropic light-absorbing particles dispersed in and substantially aligned with said liquid crystal material, wherein the particles have lengths in the range 10 nm to 10 µm, and wherein the particles comprise a clay;
   the liquid crystal material being switchable from a first orientation to a second orientation by an applied electric field;
   wherein reorientation of the liquid crystal material from said first orientation to said second orientation will cause reorientation of said particles from said first orientation to said second orientation; and wherein said particles are capable of absorbing substantially more incident light in one of said orientations than in the other of said orientations.

2. A display according to claim 1, wherein the particles are selected from the group comprising: at least one dyed clay, copper oxide herapathite, and mixtures of the aforesaid materials.

3. A display according to claim 1, wherein the particles comprise dyed montmorillonite or dyed sepiolite, or a mixture thereof.

4. A display according to claim 3, wherein the montmorillonite and/or sepiolite is dyed with a dye selected from the group comprising: Neutral Red, Bismarck Brown, Methyl Green, and mixtures of the aforesaid materials.

5. A display according to claim 1, wherein the particles comprise dyed sepiolite.

6. A display according to claim 1, wherein the particles have lengths in the range 50 nm to 500 nm.

7. A display according to claim 6, wherein the particles have length about 200 nm.

8. A display according to claim 1, wherein said particles are coated with a dispersing agent.

9. A display according to claim 8, wherein said dispersing agent is dimethyldioctadecylammonium bromide (DODAB).

10. A display according to claim 1, wherein said liquid crystal material is a nematic or chiral nematic material of positive dielectric anisotropy.

11. A display according to claim 10, wherein said surface alignment induces local planar alignment of adjacent molecules of said liquid crystal material.

12. A liquid crystal display device comprising:
- a layer of liquid crystal material of positive dielectric anisotropy between spaced-apart cell walls;
- electrodes provided on at least one cell wall for applying an electric field across at least a part of said liquid crystal material;
- a surface alignment on an inner surface of at least one of said cell walls which induces a local planar alignment of adjacent molecules of said liquid crystal material; and
- anisotropic light-absorbing particles dispersed in and substantially aligned with said liquid crystal material by the interaction of the particle surfaces with the liquid crystal material, wherein the particles have lengths in the range 10 nm to 10 μm, and wherein the particles comprise a clay;
- the liquid crystal material being switchable from the planar orientation to a homeotropic orientation by an applied electric field;
- wherein reorientation of the liquid crystal material from said planar orientation to said homeotropic orientation will cause reorientation of said particles from said planer orientation to said homeotropic orientation;
- the liquid crystal material being switchable from the homeotropic orientation to the planar orientation by said surface alignment when said applied electric field is removed;
- wherein reorientation of the liquid crystal material from the homeotropic orientation to the planar orientation will cause reorientation of the particles from the homeotropic orientation to the planar orientation; and wherein said particles are capable of absorbing substantially more incident light in the planar orientation than in the homeotropic orientation.

* * * * *